(12) United States Patent
Bell et al.

(10) Patent No.: US 11,497,237 B1
(45) Date of Patent: Nov. 15, 2022

(54) BREADING AND SIFTING STATION

(71) Applicant: AyrKing, LLC, Oklahoma City, OK (US)

(72) Inventors: James Bell, Prospect, KY (US); Chad Hamed, Louisville, KY (US); Sam Eppehimer, Louisville, KY (US)

(73) Assignee: AyrKing, LLC, Oklahoma City, OK (US)

( * ) Notice: Subject to any disclaimer, the term of this patent is extended or adjusted under 35 U.S.C. 154(b) by 152 days.

(21) Appl. No.: 16/746,407

(22) Filed: Jan. 17, 2020

(51) Int. Cl.
| | |
|---|---|
| *A23P 20/12* | (2016.01) |
| *A47B 31/00* | (2006.01) |
| *A23G 3/26* | (2006.01) |
| *A23L 17/00* | (2016.01) |
| *A23P 20/13* | (2016.01) |
| *B05C 3/09* | (2006.01) |

(52) U.S. Cl.
CPC ............ *A23P 20/12* (2016.08); *A23G 3/26* (2013.01); *A23L 17/75* (2016.08); *A23P 20/13* (2016.08); *A47B 31/00* (2013.01); *B05C 3/09* (2013.01)

(58) Field of Classification Search
CPC ........ A23P 20/12; A23P 20/13; A21C 15/002; A21C 9/04; A23G 3/26; A23L 17/75; A47J 37/00; A47B 31/00; B05C 3/09; B05C 11/00
USPC ............. 99/494; 118/13, 19; 426/289, 295
See application file for complete search history.

(56) References Cited

U.S. PATENT DOCUMENTS

| | | | |
|---|---|---|---|
| 2,756,425 A * | 7/1956 | Webber ............... | F24D 1/00 |
| | | | 126/378.1 |
| 4,182,260 A | 1/1980 | Reece | |
| 4,550,677 A | 11/1985 | Reese et al. | |
| 4,893,885 A | 1/1990 | Borello | |
| 4,952,309 A | 8/1990 | King | |
| 5,051,169 A | 9/1991 | King | |
| 6,463,862 B1 | 10/2002 | Kuhlman et al. | |
| 6,726,024 B2 * | 4/2004 | Nakano ............... | B07B 1/46 |
| | | | 209/325 |
| 7,610,864 B2 | 11/2009 | LaMarche, II et al. | |
| 7,648,147 B2 | 1/2010 | Lauer et al. | |
| 7,798,502 B2 | 9/2010 | Sukey et al. | |
| 7,913,631 B2 | 3/2011 | Hawkins | |
| 8,065,974 B1 | 11/2011 | Rome | |
| 9,055,812 B2 | 6/2015 | Fishman et al. | |
| 9,451,789 B2 | 9/2016 | Harned et al. | |
| 9,491,967 B2 | 11/2016 | Foothaker et al. | |
| 10,245,619 B2 | 4/2019 | Ambroset et al. | |
| 10,349,737 B2 | 7/2019 | Keller et al. | |
| 2005/0028730 A1 | 2/2005 | Chua et al. | |
| 2007/0000436 A1 | 1/2007 | Zweifel et al. | |
| 2007/0264397 A1 | 11/2007 | Mather et al. | |

FOREIGN PATENT DOCUMENTS

CN 2827126 Y 10/2006

* cited by examiner

*Primary Examiner* — Laura Edwards
(74) *Attorney, Agent, or Firm* — Middleton Reutlinger

(57) ABSTRACT

A breading and sifting apparatus is disclosed. The breading and sifting apparatus may include a frame, a plate, and a breading lug adapter. The breading and sifting apparatus may be configured to accommodate work surface in a lowered position and in an elevated position, as well as in a left-handed configuration and a right-handed configuration.

26 Claims, 7 Drawing Sheets

BREADING AND SIFTING STATION

BACKGROUND

This disclosure relates generally to the field of food processing and more particularly to the field of breading applications for food products. More particularly, it relates to a breading and sifting station for manually breading food products and sifting the used breading to separate the dough balls from the still-usable breading material.

Breading, a particularly prevalent practice in food preparation nowadays, is the process of applying dry particulate material to a food product to enhance the flavor and facilitate cooking of the food product. The breading material may include, for example, bread crumbs, flour, and a variety of spices depending upon the food product to be breaded. Exemplary breaded food products include chicken breasts, chicken strips, chicken nuggets, chicken wings, fish sticks, fish patties, and a variety of other meats and vegetables. As the breaded food products are highly demanded by today's consumers, fast food restaurants, traditional dining establishments, and grocery stores all carry a variety of breaded food products.

The breading process typically requires an individual to apply the breading material to the food product in a bowl, dish, or basin that contains the breading material. The food product, such as a chicken breast, may be manually coated by rolling the chicken breast in the breading material and patting or massaging the breading material directly on the chicken breast. In order to adhere the breading material to the food product, the food product is typically battered before breading to make the food product moist. However, moisture may cause the breading material to clump together. Such clumped breading material may be unsuitable for further use. Accordingly, the clumps must be removed from the used breading material during the breading process.

To facilitate the breading and sifting process, a breading and sifting station is widely used in the food processing industry, such as in commercial kitchens. The breading and sifting station usually comprises a worktop for battering and breading, and an electrically-operated sifting assembly below the worktop. The sifting assembly is structured to sift the used breading material to separate the dough balls from the still-reusable breading material and then to convey the dough balls and the still-reusable breading material into two basin-shaped containers located underneath the sifting assembly.

However, the design of a manual breading and sifting station, such as the height and the configuration may cause issues to users. Different users have different heights and different work flow configuration preferences, but traditional breading and sifting stations are not capable of reconfiguration. For example, a taller user may have to bend over to bread food products with a typical station, which causes back strain. Although traditional breading and sifting stations could be fabricated in different heights and different configurations, they are not adjustable by a user. Also, as commercial kitchen real estate is at a premium, the size of equipment, such as a breading and sifting station, is crucial in commercial kitchens, so a breading and sifting station must be kept to a small footprint.

Therefore, an ergonomic and compact breading and sifting station that addresses the above problems is desired.

SUMMARY

In view of the deficiencies described above, one object of the present disclosure is to provide a breading and sifting station that is easily configurable to accommodate varying user needs and preferences. Another object is to minimize the footprint of such breading and sifting stations on kitchen floors as well as the size of the shipping package for delivering such equipment to minimize the acquisition cost. The herein-described embodiments address these and other problems by providing a breading and sifting station that has several adjustable features and structures for modularity, height changes, and configurations. The apparatus has been designed to be adjustable on site easily to provide a maximum flexibility to the user.

In some embodiments, a breading and sifting station comprises a frame, a plate mounted on the frame, and a breading lug adapter mounted on the frame. The plate has a first opening, a second opening, a third opening, a fourth opening, and one or more collars. Each of the third opening and the fourth opening is collinear with the first opening and the second opening, respectively, and spaced therefrom by the one or more collars. The breading lug adapter has two end legs and a rear leg connecting the two end legs. Each end leg has a long support, a spacer, a short support, and a lip.

In some embodiments, the height of an upper work surface including an accessory pan, a dip pot, and a breading lug of the breading and sifting apparatus is selectively adjustable between an elevated position and a lowered position by flipping over the plate and the breading lug adapter. The elevated position is when the accessory pan and the dip pot are received in the third opening and the fourth opening of the plate, respectively, and the breading lug is supported by the two short supports. The lowered position is when the accessory pan and the dip pot are received in the first opening and the second opening of the plate, respectively, and the breading lug is supported by the two long supports.

In some embodiments, an accessory pan and a dip pot of the breading and sifting apparatus are selectively adjustable between a right-handed configuration and a left-handed configuration by rotating the plate 180 degrees in its horizontal plane.

In some embodiments, the breading and sifting apparatus further comprises a brush cover positioned between a breading lug and a sifter for receiving a used breading material mixture. The brush cover includes a flange at an opening of the brush cover and is adjustable between a first configuration and a second configuration by flipping over the brush cover. The first configuration is when the flange extends upwardly from a brush cover plate, and the second configuration is when the flange extends downwardly from the brush cover plate.

In some embodiments, a method of breading a food product using a breading and sifting apparatus having a frame comprises: (a) selecting an elevated position or a lowered position for an upper work surface including an accessory pan, a dip pot, and a breading lug; (b) placing a plate on the frame for receiving the accessory pan and the dip pot, and positioning a breading lug adapter for receiving the breading lug into the selected elevated position or lowered position; (c) selecting a left-handed configuration or a right-handed configuration for the accessory pan and the dip pot; (d) placing the plate on the frame into a selected left-handed configuration or right-handed configuration; (e) providing a batter into the dip pot; (f) providing a breading material into the breading lug; (g) applying the batter and the breading material to the food product using the breading and sifting apparatus in the selected elevated position or lowered position, and the selected left-handed configuration or right-handed configuration; and (h) sifting a used breading material mixture to separate a reusable breading material from an un-reusable breading material.

These and other advantages and features, which characterize the apparatus, are set forth in the claims annexed hereto and form a further part hereof. However, for a better understanding of the apparatus, and of the advantages and objectives attained through its use, reference should be made to the drawings, and to the accompanying descriptive matter, in which there is described example embodiments of the apparatus. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
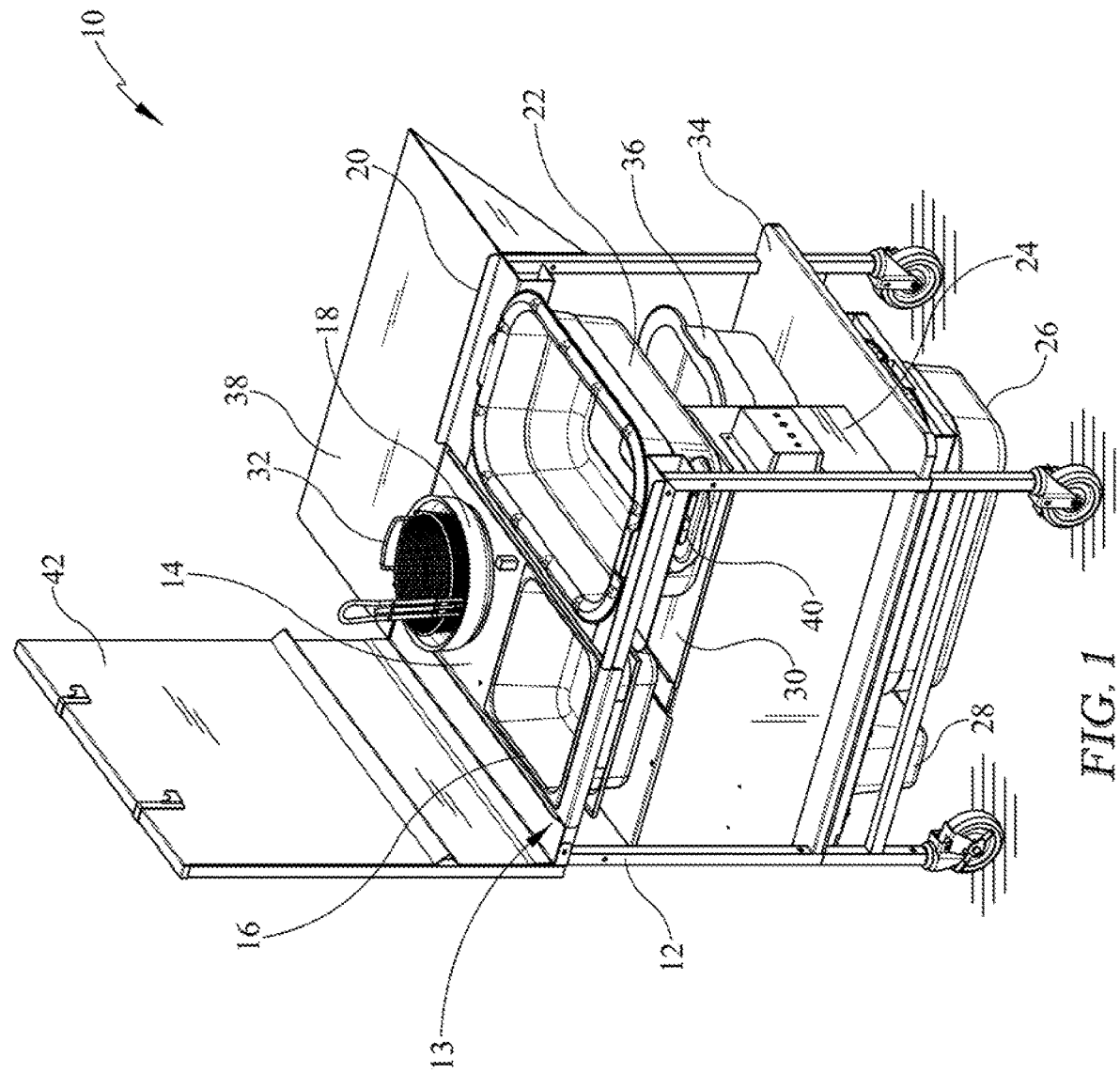
FIG. 1 is a perspective view of a breading and sifting apparatus according to an embodiment.

The embodiments discussed hereinafter will focus on the implementation of the hereinafter-described apparatus and techniques within a breading and sifting station. However, it will be appreciated that the apparatus and techniques may also be used in connection with other types of equipment in some embodiments. For example, the herein-described designs may be used for a kitchen work table made by other manufacturers. Moreover, the apparatus may be useful in any form of work station requiring flexibility. Turning now to the drawings, wherein like numbers denote like parts throughout the several views, a breading and sifting apparatus 10 in accordance with one embodiment of the present disclosure is depicted in FIG. 1. Breading and sifting apparatus 10 may include a frame 12 with an upper work surface 13 including a plate 14, an accessory pan 16, a dip pot 18, a breading lug adapter 20, and a breading lug 22. The manual battering and breading may take place on upper work surface 13 by a user. Below upper work surface 13, breading and sifting apparatus 10 may further include a sifter 24 positioned on a horizontal surface 34 coupled to frame 12. As explained in more detail below, breading and sifting apparatus 10 may be configured to divert used breading material into sifter 24 and then into either a reusable collection pan 26 (if the portion of the used breading material is able to be reused to coat additional food products) or a waste collection pan 28 next to (or inside) reusable collection pan 26 (if the portion of the used breading material is unable to be reused). Breading and sifting apparatus 10 may be used in a commercial setting, such as at a fast-food restaurant, for high-volume breading of food products.

Frame 12 may be a rigid supporting framework structured for resting on the floor. In some embodiments, frame 12 may have a plurality of wheels so breading and sifting apparatus 10 may be wheeled to any convenient location where the battering and breading of the food products is to take place. With breading and sifting apparatus 10 being mobile, the breading, the batter dipping, and the food product would be able to all be contained in the same area, so the chance for cross-contamination with other food products in the kitchen could be greatly minimized.

With reference to FIG. 1, upper work surface 13 including plate 14, accessory pan 16, dip pot 18, breading lug adapter 20, and breading lug 22 may be arranged substantially horizontal on frame 12. Plate 14 is mounted to frame 12, and may have a plurality of openings defining perimeters. For example, plate 14 may have a first opening 15 to receive accessory pan 16 and a second opening 17 to receive dip pot 18. Accessory pan 16 (for example, for the food product inspection) may be received in first opening 15. Dip pot 18 for applying a batter to the food product may be received in second opening 17 next to accessory pan 16 in plate 14. Upper work surface 13 may also include an opening (discussed below) for breading lug adapter 20 for receiving breading lug 22 for applying a breading material to the food product covered with the batter. Accessory pan 16, dip pot 18, and breading lug 22 may be inserted in pass-through or slippable manner and recessed into upper work surface 13 in easy manually removable or extractable manner.

Figure 2:
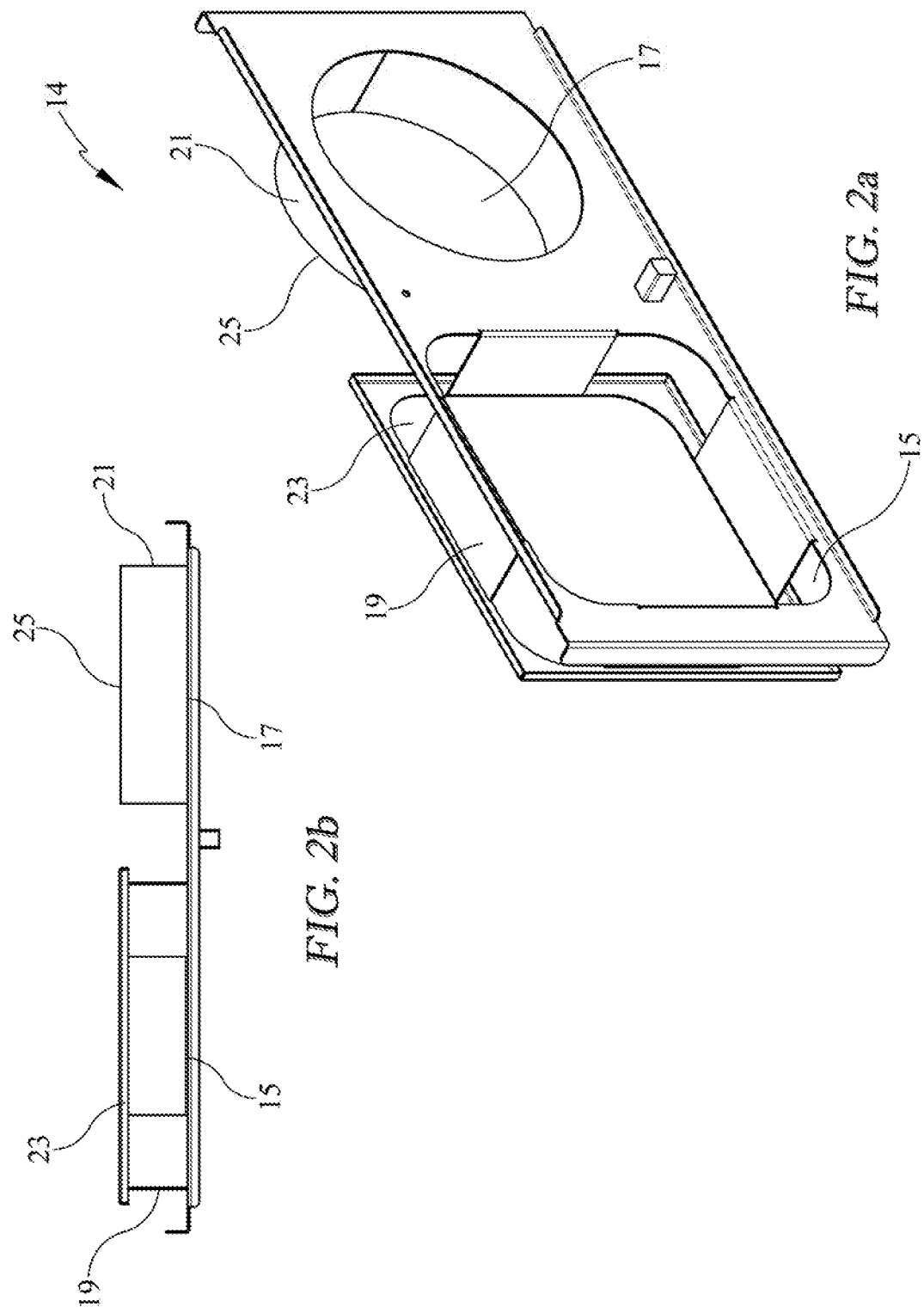
FIG. 2a is a perspective view of a plate according to an embodiment.
FIG. 2b is a front view of the plate in FIG. 2a according to an embodiment.

Referring to FIGS. 1, 2a, and 2b, plate 14 may have two openings 15 and 17. First opening 15 for holding accessory pan 16 may be in a rectangular shape, and second opening 17 for holding dip pot 18 may be in a circular shape. It should be noted, however, that first and second openings 15 and 17 may be in any shape to match or complement the containers they are holding. Plate 14 may also have one or more collars 19 and 21 having a given height (e.g. 5 inches), depending downwardly from one side of plate 14. Collars 19 and 21 may be connected to plate 14 in a variety of well-known ways (e.g. welding, etc.). Plate 14 may also have a third opening 23 and a fourth opening 25. Third opening 23 is collinear with respective first opening 15, and fourth opening 25 is collinear with respective second opening 17. Third opening 23 is separated from first opening 15 by the distance of the height of collar 19, and fourth opening 25 is also separated from second opening 17 by the same distance of the same height of collar 21. By lifting out plate 14 and turning it upside down, third and fourth openings 23 and 25 are now suited to receive accessory pan 16 and dip pot 18, respectively. Accordingly, by flipping plate 14 over, the heights of accessory pan 16 and dip pot 18 may be adjusted between an elevated position and a lowered position. The elevated position is a higher working position when accessory pan 16 and dip pot 18 are received in the third and fourth openings 23 and 25, respectively. The additional height of the elevated position may be equal to the heights of collars 19 and 21. The lowered position is a lower working position when accessory pan 16 and dip pot 18 are received in first and second openings 15 and 17, respectively.

Figure 7:
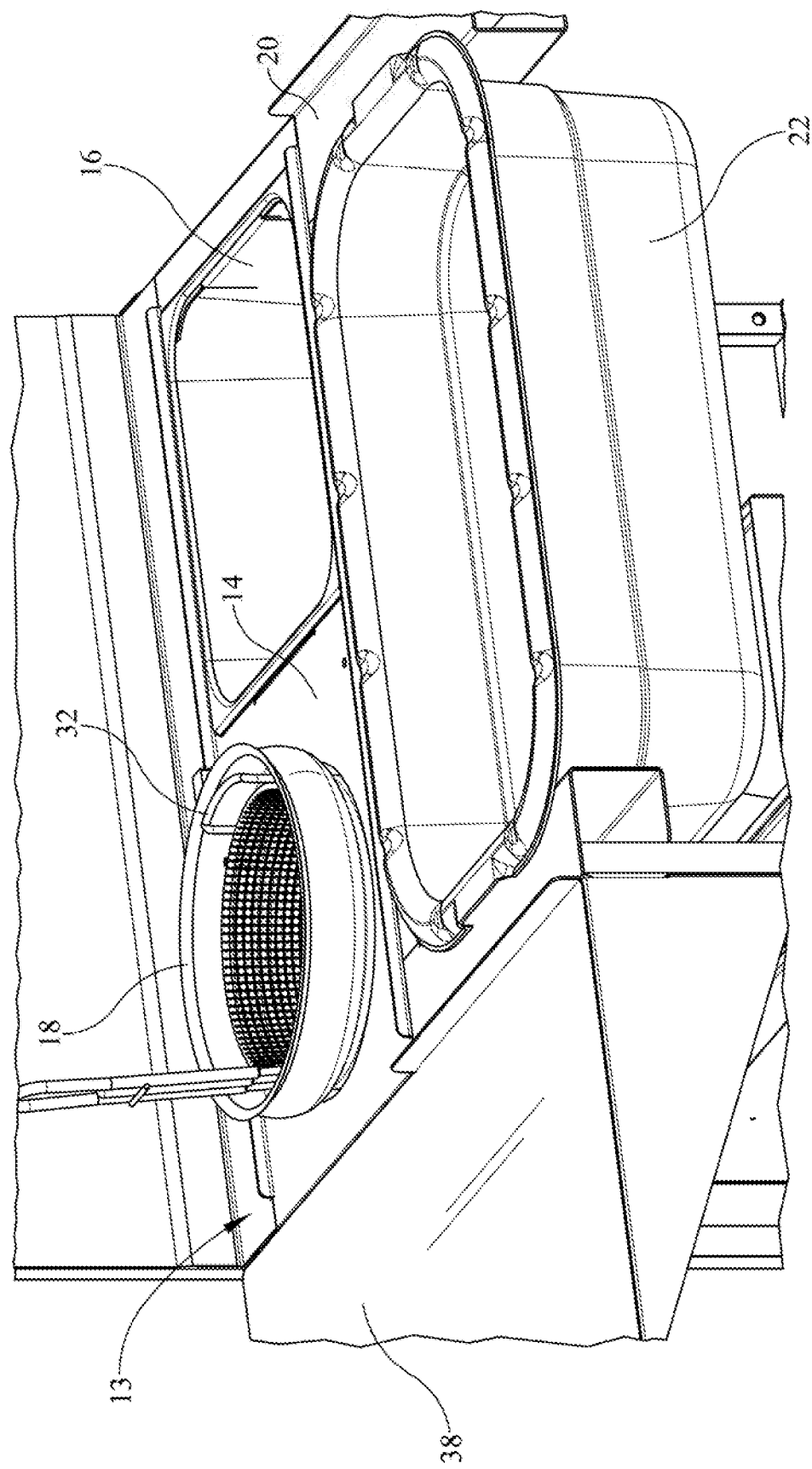
FIG. 7 is a partial perspective view of the breading and sifting apparatus in FIG. 1, shown in a left-handed configuration according to an embodiment.

In some embodiments, in addition to being flippable to raise or lower the heights of accessory pan 16 and dip pot 18, plate 14 may be also rotated 180 degrees in its horizontal plane. This adjustable feature may allow both a left-handed configuration (that is, inspect on the left side and batter on the right side) and a right-handed configuration (that is, inspect on the right side and batter on the left side) of breading and sifting apparatus 10 to batter and bread the food product optimally, therefore making the breading process more efficient. FIG. 7 shows accessory pan 16 and dip pot 18 in the left-handed configuration. In summary, plate 14 may be flipped over to raise or lower the heights of accessory pan 16 and dip pot 18 to match the height preference of the user, and may also be rotated horizontally to position dip pot 18 on the left or right side according to the user's preference, making the battering process more ergonomically friendly for both left-handed and right handed configurations.

Figure 3:
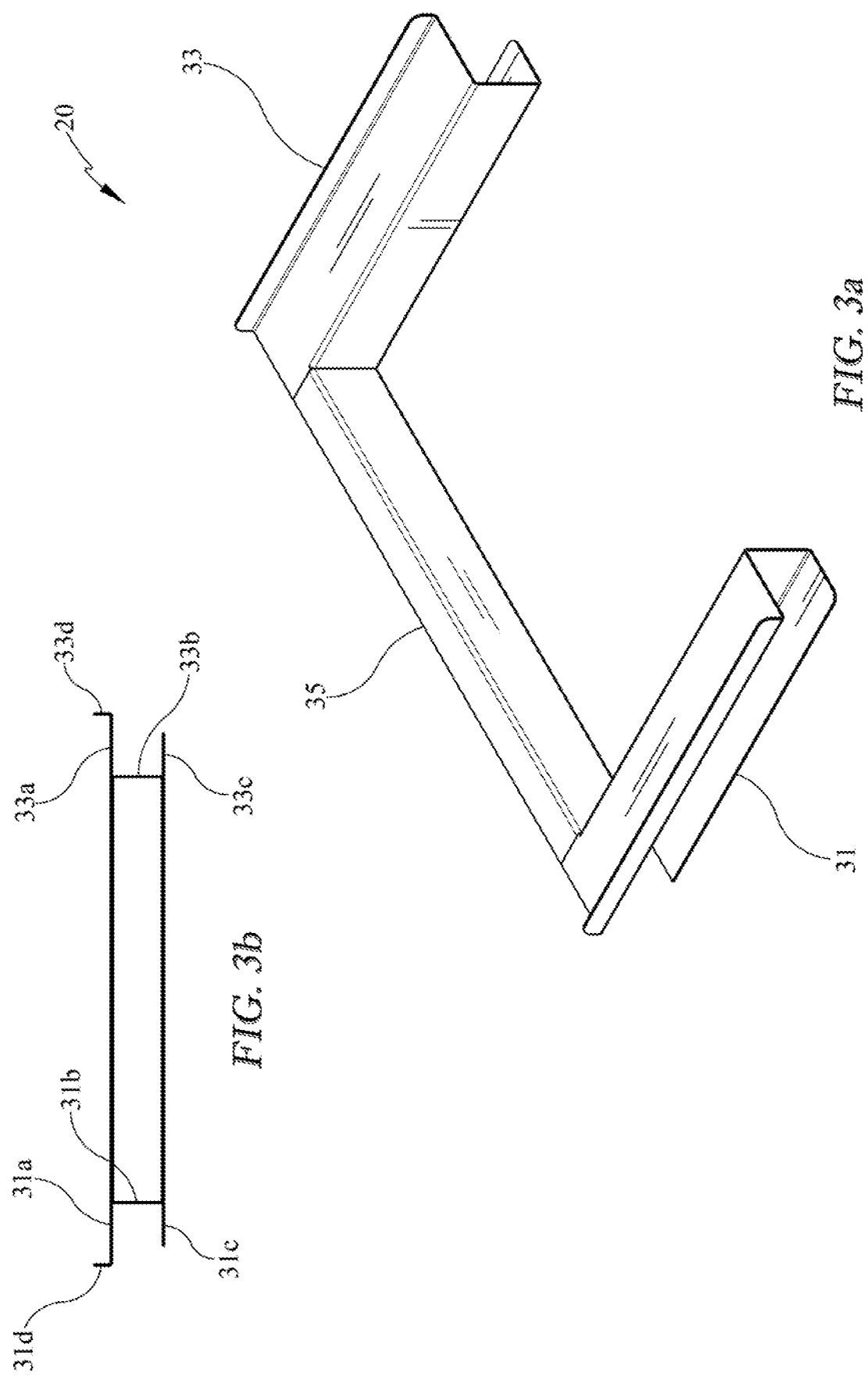
FIG. 3a is a perspective view of a breading lug adapter according to an embodiment.
FIG. 3b is a front view of the breading lug adapter in FIG. 3a according to an embodiment.
Figure 5:
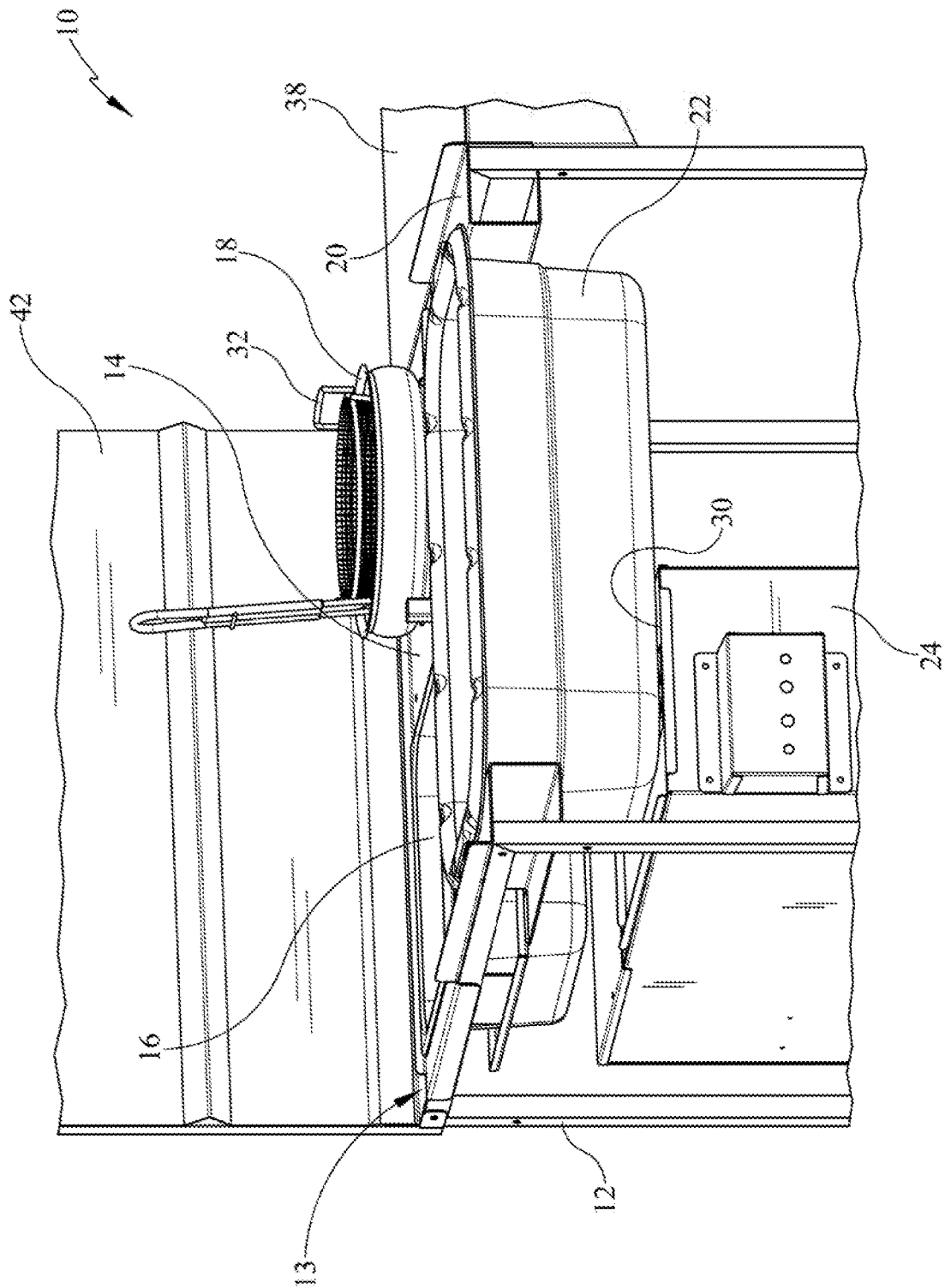
FIG. 5 is a partial perspective view of the breading and sifting apparatus in FIG. 1, shown in a lowered position according to an embodiment.
Figure 6:
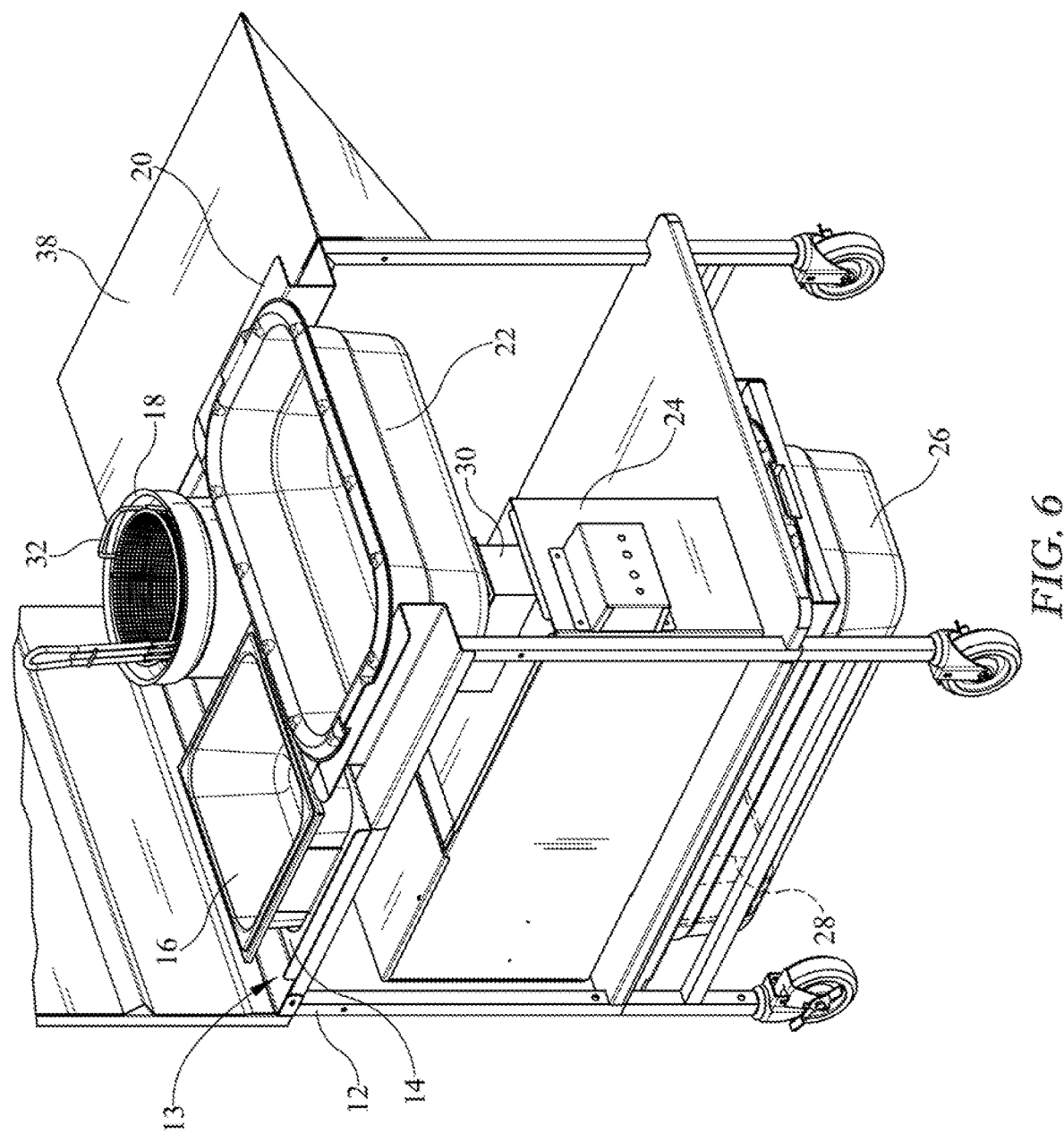
FIG. 6 is a partial perspective view of the breading and sifting apparatus in FIG. 1, shown in an elevated position according to an embodiment.

In some embodiments as shown in FIGS. 3a and 3b, breading lug adapter 20 may be a U-shaped rail including a first U-shaped leg 31, a second U-shaped leg 33, and a rear leg 35. First U-shaped leg 31 comprises a first long support 31a, a first spacer 31b, a first short support 31c, and a first lip 31d. Similarly, second U-shaped leg 33 comprises a second long support 33a, a second spacer 33b, a second short support 33c, and a second lip 33d. First and second long supports 31a and 33a may be longer than first and second short support legs 31c and 33c, respectively. Accordingly, by flipping breading lug adapter 20 over, the height of breading lug 22 may be adjusted between the elevated position and the lowered position in accordance with the heights of accessory pan 16 and dip pot 18 as desired. In the elevated position, breading lug 22 is received by first and second short support legs 31c and 33c. The additional height of the elevated position may be equal to the heights of first and second spacers 31b and 33b, which may be equal to the heights of collars 19 and 21 of plate 14. In the lowered position, breading lug 22 is received by first and second long support legs 31a and 33a. Therefore, the height of breading lug 22 may be also adjusted by flipping breading lug adapter 20 over to have a similar height as accessory pan 16 and dip pot 18 according to the user's preference. FIG. 5 shows accessory pan 16, dip pot 18, and breading lug 22 in the lowered position, and FIG. 6 shows accessory pan 16, dip pot 18, and breading lug 22 in the elevated position.

In breading operation using breading and sifting apparatus 10, one or more food products that are to be battered and breaded are first placed into accessory pan 16 for inspection, and batter to be applied to the food products is poured into dip pot 18. After inspection, good food products are transferred to dip pot 18 filled with the batter, and the batter is used to moisten the food products with a liquid coating for the breading in the next step. In some embodiments, dip pot 18 may further include a dip basket 32 to facilitate removal of the food products. Alternately, the food products may be placed within dip basket 32 instead of within dip pot 18 directly after the inspection in accessory pan 16. Once the food products are adequately covered with batter, the user may raise dip basket 32 by the basket handle to a position such that the food products are raised out of the batter to drain off the excess batter, and transfer the food products from dip basket 32 into breading lug 22 filled with the breading material. The breading material could be any of a number of breading types such as bread crumbs, flour, corn meal, etc., and could be made up according to the recipe of the user. For example, a breading material may be composed essentially of flour with the addition of salt and spices or other flavor adding ingredients. The food products are manually manipulated in the breading material in breading lug 22 by the user. By manual manipulation, the food products are tumbled about in the breading material until the breading material adequately coats the food products (the breading material will stick to the food products because of the batter that already coats them). Then the food products are ready to be removed from breading lug 22 for cooking, such as deep frying. In some embodiments, the food products may be removed from breading lug 22 and placed into another container 36 awaiting cooking. Container 36 for receiving the battered and breaded food products may be stored on a horizontal surface 34 attached to frame 12 under breading lug 22 next to sifter 24.

During the breading process, the batter causes the formation of dough when the liquid batter mixes with the breading material, and while most of dough adheres to the food products, some may dislodge and remain in breading lug 22 in the form of dough balls. When dough balls collect to a certain extent, they may interfere with the breading operation, so the dough balls have to be sifted therefrom in order for the remaining good breading material to be reused. For the sifting purpose, breading lug 22 may include a drain or opening 40 in the bottom surface through which a used breading material mixture may be passed, and a removable plug (not visible in FIG. 1) may be in the bottom thereof. Opening 40 may be plugged during breading process, or unplugged to allow passage of the used breading material mixture to fall into sifter 24 disposed below breading lug 22 through opening 40. Sifter 24 may be rigidly fixed on horizontal surface 34 attached to frame 12 underneath the upper work surface, substantially vertically aligned underneath opening 40 of breading lug 22, so that the used breading material mixture, including the reusable breading material and dough balls coming out of opening 40 of breading lug 22 directly falls by gravity into sifter 24.

Figure 4:
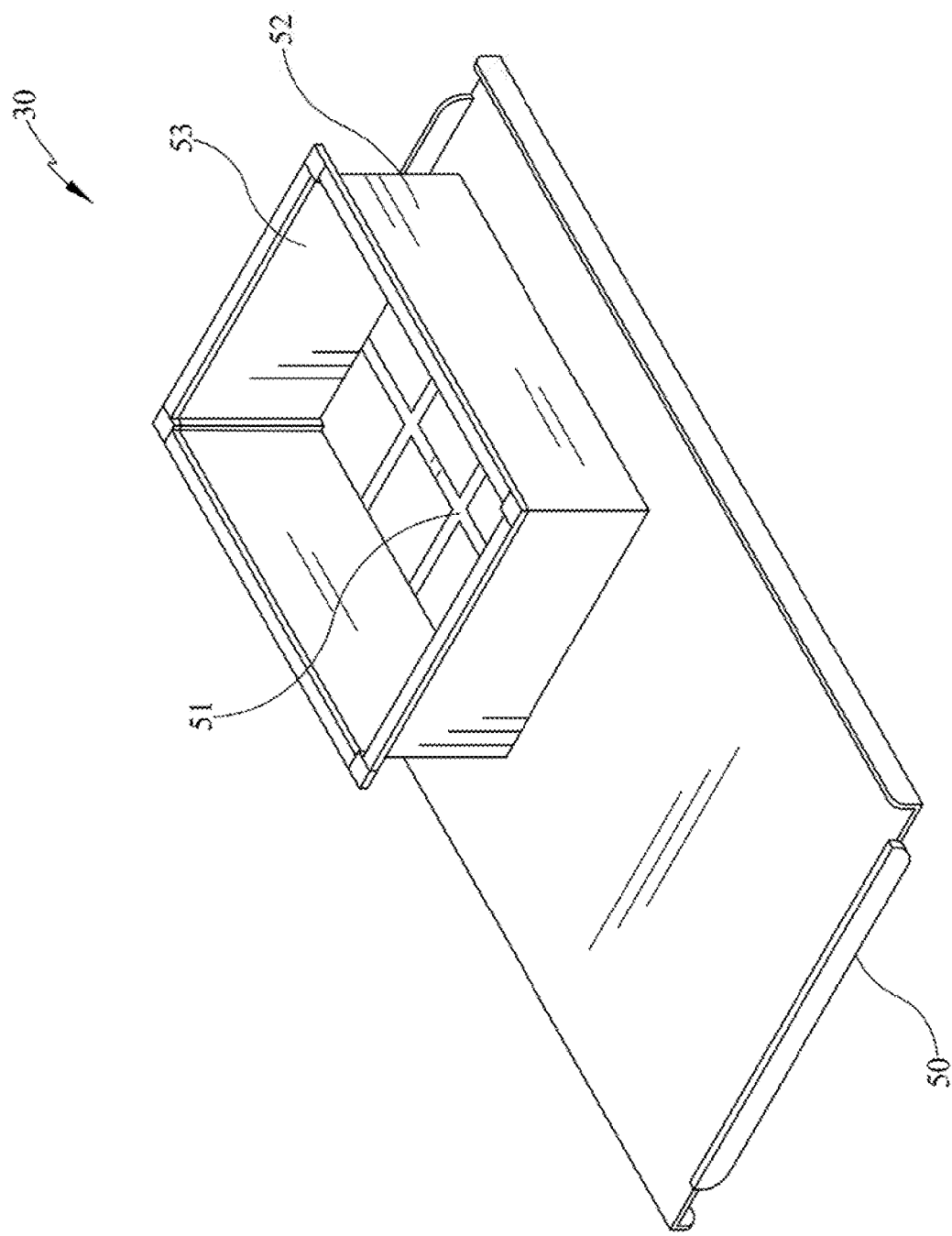
FIG. 4 is a perspective view of a brush cover according to an embodiment.

Referring to FIG. 4, in some embodiments, sifter 24 may further include a brush cover 30 to prevent foreign objects from falling into sifter 24. Brush cover 30 includes a brush cover plate 50 having a screened opening 51 therethrough. Screened opening 51 is surrounded by a flange 52. Flange 52 has a brush cover opening 53 collinear with screened opening 51. Flange 52 has a flange height that separates screened opening 51 from brush cover opening 53. Brush cover 30, like plate 14 and breading lug adapter 20, may be flipped over such that brush cover 30 may occupy a first configuration (with flange 52 extending upwardly from brush cover plate 50) and a second configuration (with flange 52 extending downwardly from brush cover plate 50). Brush cover 30 may be also used as a support for breading lug 22 in the first and second configurations, so breading lug 22 is always closely coupled with sifter 24 to prevent leaks. In other words, when breading lug 22 is adjusted between the elevated and lowered positions, brush cover 30 may be also adjusted between the first and second configurations to match the height of breading lug 22. When breading lug 22 is in the elevated position, brush cover 30 may be in the first configuration so as to catch the used breading material mixture falling from opening 40 in the bottom of breading lug 22. Similarly, when breading lug 22 is in the lowered position, brush cover 30 may be then flipped over to be in the second configuration so that it still mates with the bottom of breading lug 22. FIG. 5 shows brush cover 30 in the lowered position, and FIG. 6 shows brush cover 30 in the elevated position.

Situated still further below sifter 24 may be two containers for collecting the still-usable breading material and un-usable breading material, and the two containers may be reusable collection pan 26 and waste collection pan 28.

Reusable collection pan 26 is designed for receiving the still-usable breading material, whereas waste collection pan 28 is designed for receiving the dough balls and/or other impurities to be discarded. In some embodiments, waste collection pan 28 may be separate from and located next to reusable collection pan 26, as shown in FIG. 1. In some embodiments, waste collection pan 28 may be inside of/nested in a rear portion of reusable collection pan 26, as shown in FIG. 6, and waste collection pan 28 may be removable from or fixed in reusable collection pan 26.

In some embodiments, sifter 24 may be electrically-operated and operated via a movement device within the housing of sifter 24. The moving device causes a rotating auger brush to sweep the used breading mixture from the front end of sifter 24 to the rear end. The acceptable breading material falls through an opening of sifter 24 into reusable collection pan 26 along the way; the undesirable breading material (dough balls) gets pushed out of the opening of sifter 24 and into waste collection pan 28.

In some embodiments, reusable collection pan 26 may replace breading lug 22 on breading lug adapter 20 directly, so reusable collection pan 26 may be the same size, with an opening and a removable plug as breading lug 22 in order to be able to be fit on breading lug adapter 20 directly and continue the sifting process without interruptions. Because breading lug 22 and reusable collection pan 26 may be removed by the user often, breading lug 22 and reusable collection pan 26 may be made from light materials such as plastic.

In some embodiments, breading and sifting apparatus 10 may have a removable side shelf 38 configured to be able to attach to both or either a left side or a right side of frame 12. In some embodiments, shelf 38 may be attached through a plurality of keyholes mating with a plurality of pins on both left and right side of frame 12. Again, currently the industry provides a unit that either has a shelf on the left, or a shelf on the right, and the user has to order an entire equipment based on whether the shelf is on the left or on the right. Sometimes, an equipment with a fixed left or right side shelf may not fit in the user's kitchen with a particular arrangement. Breading and sifting apparatus 10 provided here has a side shelf that may be lifted off from the unit and moved to either side according to the users preference. FIG. 7 shows side shelf 38 on the left side of frame 12.

In some embodiments, breading and sifting apparatus 10 may also have a back surface 42 extending upward from plate 14 in the back of frame 12 as illustrated in FIG. 1. Thus, back surface 42 may be used for shielding against spillage or splashing during the operation of breading and sifting apparatus 10. In some embodiments, back surface 42 may be able to rotate 90 degrees from a vertical position and folded over to a horizontal position, acting as a top cover of breading and sifting apparatus 10. Often, kitchen users want more flat, horizontal, clear working surfaces, and back surface 42 may be folded to become a flat, horizontal, and clear working surface for the kitchen user in these embodiments.

A method for breading a food product using a breading and sifting apparatus 10 is also provided. The steps may start by a user selecting an elevated position or a lowered position for an upper work surface 13 including an accessory pan 16, a dip pot 18, and a breading lug 22. The user then places a plate 14 for receiving accessory pan 16 and dip pot 18, and a breading lug adapter 20 for receiving breading lug 22 into one of the two configurations (the elevated position or the lowered position). In the elevated position, accessory pan 16 and dip pot 18 are received in third opening 23 and fourth opening 25, respectively, and breading lug 22 is received by first short support 31c and second short support 33c. In the lowered position, accessory pan 16 and dip pot 18 are received in first opening 15 and second opening 17, respectively, and breading lug 22 is received by first long support 31a and second long support 33a. The user may also select a left-handed or a right-handed configuration for accessory pan 16 and dip pot 18. The user then places plate 14 into the selected left-handed or a right-handed configuration. Next, the user fills dip pot 18 in the decided configuration with a batter and fills breading lug 22 in the decided configuration with a desired breading material. The user then applies the batter and the breading material to a food product using breading and sifting apparatus 10 with the user selected configuration. A sifter 24 then receives and sifts a used breading material mixture to separate a reusable breading material from an un-reusable breading material.

In some embodiments, the step of selecting the elevated position or the lowered position for upper work surface 13 may be achieved by flipping plate 14 and breading lug adapter 20 over. In some embodiments, the step of selecting a left-handed or a right-handed configuration for accessory pan 16 and dip pot 18 may be achieved by rotating plate 14 180 degrees in its horizontal plane. In some embodiments, before sifting the used breading material mixture, the height of a brush cover 30 may be adjusted to match the selected elevated position or the selected lowered position of breading lug 22, and brush cover 30 may be adjusted by flipping it over. In some embodiments, the method may further include a step of attaching a side shelf 38 either on a left side or a right side of breading and sifting apparatus 10.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used.

Those skilled in the art may recognize, or be able to ascertain using no more than routine experimentation, equivalents to the specific embodiments described herein. It is, therefore, to be understood that the foregoing embodiments are presented by way of example only and that, within the scope of the appended claims and equivalents thereto, embodiments may be practiced otherwise than as specifically described, yet still be encompassed by the claims. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. Other embodiments can be being practiced or carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments has been presented for purposes of illustration. It is not intended to be exhaustive or to limit the scope to the precise steps and/or forms disclosed, and obviously many modifications and variations are possible in light of the above teaching. Various additional modifications may be made to the illustrated embodiments consistent with the spirit of the invention.

What is claimed is:

1. A breading and sifting apparatus comprising:
   a frame including a frame upper work surface;
   a plate configured to be selectively removably coupled to said frame in a first position and in a second position, wherein said second position is obtained by rotating said plate 180 degrees about a horizontal axis thereof, said plate having a first opening and a second opening, wherein said plate has one or more collars on one side of said plate, and said plate further has a third opening and a fourth opening, each collinear with respective said first opening and said second opening and spaced therefrom by said one or more collars;
   a breading lug adapter configured to be selectively removably coupled to said frame in a first position and in a second position, wherein said second position is obtained by rotating said breading lug adapter 180 degrees about a horizontal axis thereof, wherein said breading lug adapter has two end legs and a rear leg connecting said two end legs, wherein each end leg has a first support, a spacer, a second support, and a lip, wherein said first support is of a greater length than said second support; and
   a sifter located below said breading lug adapter.

2. The breading and sifting apparatus of claim 1, wherein when said plate is in said second position, a height above said frame upper work surface of said first opening and of said second opening is greater than a height of said third opening and said fourth opening, respectively, when said plate is in said first position.

3. The breading and sifting apparatus of claim 2, wherein an accessory pan is received in said third opening and a dip pot is received in said fourth opening when said plate is in said second position.

4. The breading and sifting apparatus of claim 2, wherein an accessory pan is received in said first opening and a dip pot is received in said second opening when said plate is in said first position.

5. The breading and sifting apparatus of claim 1, wherein said first opening and said second opening are configured to be selectively rotatable between a right-handed configuration and a left-handed configuration by rotating said plate 180 degrees in a horizontal plane.

6. The breading and sifting apparatus of claim 1 further comprising a brush cover positioned between said breading lug adapter and said sifter for receiving a used breading material mixture.

7. The breading and sifting apparatus of claim 6, wherein said brush cover includes a flange at an opening of said brush cover.

8. The breading and sifting apparatus of claim 7, wherein said brush cover is selectively alternately coupled to said apparatus in a first configuration and a second configuration by rotating said brush cover 180 degrees about a horizontal axis thereof.

9. The breading and sifting apparatus of claim 8, wherein in said first configuration, said flange extends upwardly from a brush cover plate, and in said second configuration, said flange extends downwardly from said brush cover plate.

10. The breading and sifting apparatus of claim 1 wherein said sifter is configured to separate a reusable breading material from an un-reusable breading material by sifting a used breading material mixture.

11. The breading and sifting apparatus of claim 10, wherein said sifter is further configured to separately convey said reusable breading material and said un-reusable breading material into two containers.

12. The breading and sifting apparatus of claim 1, wherein said frame has a side shelf.

13. The breading and sifting apparatus of claim 12, wherein said side shelf is configured to be attached to either or both a left side and a right side of said frame.

14. The breading and sifting apparatus of claim 13, wherein said side shelf has a plurality of keyholes that mate with a plurality of pins located on both said left side and said right side of said frame.

15. The breading and sifting apparatus of claim 1, wherein said frame has a back surface configurable between a vertical position and a horizontal position.

16. A method of breading a food product using a breading and sifting apparatus having a frame, the steps comprising:
(a) providing an apparatus having a frame, a plate, a breading lug adapter, and a sifter with a brush cover alternately coupled to said sifter in a first configuration and a second configuration; said plate having a first side and a second side and configured to be selectively mounted to said frame in a first position and a second position and also separately in a left-handed configuration and a right-handed configuration, said plate having a first accessory pan opening in said first side and a first dip pot opening in said first side, said plate having one or more collars on said second side of said plate, and said plate further having a second accessory pan opening and a second dip pot opening, said first accessory pan opening collinear with said second accessory pan opening and spaced therefrom by one of said one or more collars, and said first dip pot opening collinear with said second dip pot opening and spaced therefrom by one of said one or more collars; wherein said adapter is configured to be selectively coupled to said frame in a first position and a second position, wherein said adapter has two end legs and a rear leg connecting said two end legs, wherein each end leg has a first support, a spacer, a second support, and a lip, wherein said first support is of a greater length than said second support; and wherein said plate is configured to provide an upper work surface that is configured to occupy a first position and a second position, wherein in said first position said first accessory pan opening and said first dip pot opening are located above said second accessory pan opening and said second dip pot opening, respectively; and wherein said breading lug adapter is configured to provide an upper work surface that is configured to occupy a first position and a second position, wherein in said first position said upper work surface is spaced above said frame by said spacer;
(b) selecting either said first position or said second position for said upper work surface of said plate and of said adapter;
(c) placing said plate on said frame for receiving an accessory pan and a dip pot, and positioning said adapter for receiving a breading lug into said selected first position or second position;
(d) selecting a left-handed configuration or a right-handed configuration for said plate;
(e) placing said plate on said frame into said selected left-handed configuration or right-handed configuration;
(f) inserting a dip pot into said dip pot opening, inserting an accessory pan into said accessory pan opening, and inserting a breading lug in said breading lug adapter;
(g) providing a batter into said dip pot in said selected first position or second position, and said selected left-handed configuration or right-handed configuration;
(h) providing a breading material into said breading lug in said selected first position or second position;
(i) applying said batter and said breading material to the food product using the breading and sifting apparatus in said selected first position or second position, and said selected left-handed configuration or right-handed configuration; and
(j) sifting a used breading material mixture to separate a reusable breading material from an un-reusable breading material.

17. The method of claim 16, wherein step (c) comprises flipping over said plate and said adapter to select between said first position or said second position.

18. The method of claim 16, wherein step (e) comprises rotating said plate 180 degrees in its horizontal plane to select said left-handed configuration or said right-handed configuration.

19. The method of claim 16, wherein step (j) comprises placing said brush cover in said first configuration when said breading lug adapter is in said first position, or placing said brush cover in said second configuration when said breading lug adapter is in said second position.

20. The method of claim 16 further comprising a step of attaching a side shelf either on a left side or a right side of the breading and sifting apparatus.

21. The breading and sifting apparatus of claim 1, wherein said breading lug adapter is a U-shaped rail.

22. The breading and sifting apparatus of claim 11, wherein said two containers are separate from each other.

23. The breading and sifting apparatus of claim 1, further comprising a breading lug received in said breading lug adapter.

24. The breading and sifting apparatus of claim 23, wherein a height of an upper surface of said breading lug adapter above said frame upper work surface is higher when said breading lug adapter is in said second position than in said first position.

25. The breading and sifting apparatus of claim 24, wherein when said breading lug adapter is in said second position, said breading lug rests on said second support of each of said end legs.

26. The breading and sifting apparatus of claim 24, wherein when said breading lug adapter is in said first position, said breading lug rests on said first support of each of said end legs.

\* \* \* \* \*

UNITED STATES PATENT AND TRADEMARK OFFICE
CERTIFICATE OF CORRECTION

| | |
|---|---|
| PATENT NO. | : 11,497,237 B1 |
| APPLICATION NO. | : 16/746407 |
| DATED | : November 15, 2022 |
| INVENTOR(S) | : James Bell, Chad Harned and Sam Eppehimer |

It is certified that error appears in the above-identified patent and that said Letters Patent is hereby corrected as shown below:

On the Title Page

(72) Inventors: Line 2, delete "Hamed" and insert -- Harned --

Signed and Sealed this
Twenty-eighth Day of February, 2023

Katherine Kelly Vidal
*Director of the United States Patent and Trademark Office*